June 17, 1958   A. V. KNOLLENBERG   2,838,825
VALVE ACTUATING MECHANISM
Filed Oct. 4, 1954
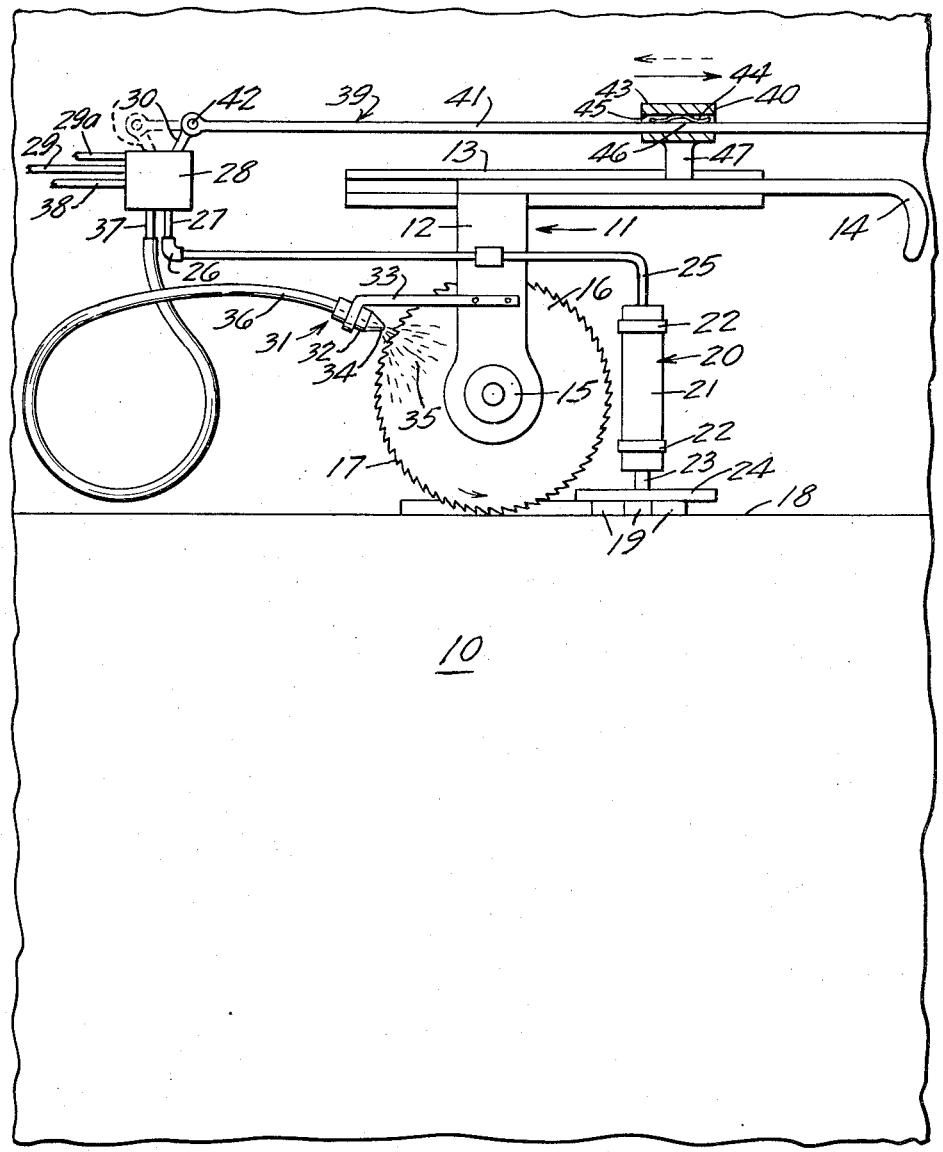
INVENTOR
ALLEN V. KNOLLENBERG
BY
Williamson, Williamson, Schroeder & Adams
ATTORNEYS United States Patent Office 2,838,825
Patented June 17, 1958

2,838,825

VALVE ACTUATING MECHANISM

Allen V. Knollenberg, Minneapolis, Minn., assignor to Self Storing Window Co., Inc., Minneapolis, Minn., a corporation of Minnesota Application October 4, 1954, Serial No. 459,887

6 Claims. (Cl. 29—69)

This invention relates to machines having relatively moving members and valve control or operation of one or more of the members, and more particularly to a valve actuating mechanism therefor.

In machinery of a nature such as the type requiring simultaneous and sequential valve operation of one part with a mechanical relative movement of another part, there exists the need for interdependent control of the relatively moving parts. Obviously a complex machine may be supplied with a number of manual levers so that the work of the individual members may be controlled and timed in a completely independent manner, the interrelation of the parts being dependent entirely upon the skill of the operator who manually controls the members. There is no particular problem involved in mechanizing or making automatic the operation of such members where the interrelation of the parts which relatively move is in a proportional or geometric basis. In such instances, the interaction of the parts can be simply accomplished through mechanical linkage such as gears, levers and the like. When there is interrelation on a time or cyclic basis, cams, electrical controls and the like may be simply employed. Occasionally, however, there exists a situation where, of interrelated and relatively movable members, one such member may be required to move from a starting position to a stop position of variable distance depending on the requirements of the operator or of the work to be performed. A specific example of such a member is a saw carriage designed for linear movement and having mounted thereon an energized saw blade adapted to travel transversely of a workpiece or plurality of workpieces held in position on the machine. Such machine is typified by the sash saw disclosed in the patent application, Serial No. 450,132, filed Aug. 16, 1954 and entitled "Sash Saw," of which I was coinventer. In that equipment, a variable number of stock material or workpieces could be clamped in position and necessitating transverse saw cuts of a variety of lengths. The saw is caused to travel together with the carriage until the cut is complete. For the sake of efficiency, the carriage is returned to its starting position immediately after completing the cut. Obviously to run the carriage for its full limit of movement where such is not required, would be wasteful of time and would subject the equipment to unnecessary wear. Along with the foregoing situation, there occasionally exists the need for a second member relatively movable with respect to the first and the operation of which is controlled by valve means in response to the relative movement and in accordance with the distance and the direction of such movement. Applying the same specific example, a valve member may be utilized in the sash saw machinery for spraying coolant and cutting fluid upon the saw blade as it cuts through the metal sash workpieces. It is desired in the interest of economy to stop the application of liquid coolant and cutting agent at the very instant the cut is completed and irrespective of the distance traveled by the carriage and saw. The valve is therefore opened instantaneously with the beginning of forward travel of the carriage and closed instantly with the beginning of the return thereof no matter how slowly or rapidly the carriage proceeds or what distance is required to complete the cut.

Another specific example is where a clamping member, such as the type disclosed in the above entitled copending application, is required to be energized or actuated during the specific period that the saw travels across the workpieces and then may be instantaneously released as the carriage travels back to its starting position. It is also desired in this case to apply hydraulic clamping pressure immediately preceding the actual sawing operation and to release such clamping pressure immediately upon completion of the cut and upon return of the carriage, irrespective of the time employed for the cutting operation or the distance traveled.

This invention contemplates that the coaction of relatively movable members in situations such as exemplified above can be accomplished by means eliminating the usual interconnecting gear trains, cam devices, lever systems, catch and release devices, and electrical switching mechanisms.

It is therefore an important object of the invention to provide a valve actuating system for machinery having several members relatively movable and requiring interdependent coaction, said system being of extremely simple nature yet meeting efficiently the need for automatic operation of interdependent members.

It is another object of the invention to provide a valve actuating mechanism which, without complicated and adjustable mechanism involving gears, electrical switches and the like, will simply actuate the valve upon the initiating of movement of a reciprocable machine member in one direction and, irrespective of the time and distance in the travel of said member, reverse the valve member as soon as the member is caused to begin its travel in the reverse direction.

These and other objects and advantages of the invention will more fully appear from the following description made in connection with the accompanying drawings, wherein like reference characters refer to the same or similar parts throughout the several views, and in which:

The drawing diagrammatically illustrates a machine having a plurality of machine members at least some of which are relatively movable with respect to others, and the machine being provided with valve actuation for a plurality of the members, the diagrammatic illustration being typified by a movable saw and carriage with a coolant applicator and a fluid actuated clamping mechanism; unnecessary portions of the device are cut away and others are shown in alternate dotted line position and cross section.

Referring now more particularly to the drawing, the general machine structure including a rigid base is shown generally at 10. A movable member is indicated generally at 11 and constitutes a carriage 12 which in turn is slidably mounted for reciprocation on the mount 13 and has means such as handle 14 for shifting the carriage 12 through various distances along the mounting structure 13. The carriage 12 has secured thereto a motor 15 having an axially mounted saw blade 16, the peripheral teeth 17 of which are adapted to lie in a projected path across a sawing table 18 in a manner generally known in the art.

A plurality of workpieces 19 are placed in position on the table top 18 and are held in position for sawing by blade 16 during travel of the saw blade in a direction to the right as indicated by the full line arrow. Another machine member is indicated generally at 20 and constitutes a clamping means for the workpieces 19. The clamping means in the instant case comprises a hydraulic ram cylinder 21 which is rigidly secured by such means as bracket members 22 to the machine body 10 and is provided with an outwardly extending shaft 23 terminating in a clamping plate 24 as shown. The clamping means 20 is provided with an inlet tube 25 which supplies fluid under pressure to actuate the ram, said tube being supported rigidly with respect to the machine body 10 and interconnecting through a fitting such as 26 with the outlet 27 of valve 28. A suitable source of supply (not shown) of pressurized fluid enters through tube 29 as shown. The valve 28 may be any suitable type of valve for handling pressurized fluids and to control the flow of fluid therethrough by means of a movable element having an external portion 30 adapted to be moved from one position to the other to effect a change in fluid control. In the instant case, the valve 28 is provided with a radial arm for the external member 30 so that fluid under pressure will be permitted to flow from tube 29 and the valve 28, then out through outlet 27 and through passageway 25 to actuate the hydraulic ram 21 for clamping the workpieces 19 firmly against the work surface 18. Means for returning the fluid may be provided as is common in the art via outlet 29a upon swinging of the valve arm 30 to the dotted line position. Another type of machine member which can also be actuated by another valve or by the same valve 28 is provided where the movable portion is interconnected in tandem to simultaneously control fluid flow through separate passages and independently of each other. The second machine member is indicated generally at 31 and constitutes a spray applicator having a nozzle member 32 which is mounted through bracket 33 to the carriage 12 and having an orifice 34 positioned to spray coolant or cutting liquid 35 upon the surface and saw teeth 17 of the circular saw blade 16. The machine element 31 is supplied with the proper fluid through flexible tube 36 which in turn is attached to an outlet 37 forming a part of the independent fluid system controlled by the single radial arm 30 as shown. The inlet tube 38 supplies fluid to the outlet 37 and is adapted to have its fluid flow interrupted in the same manner as the hydraulic fluid passing from the supply line 29 to the outlet 37.

My invention particularly constitutes the valve actuating mechanism which in turn is composed of an actuator element 39 and an interconnecting drive element 40 as shown. The actuator element 39 preferably is an elongated rod 41 of constant cross sectional dimension attached to the radial member 30 as by pivot connection 42 and extends in the general direction of travel of the movable machine member 11. The interconnecting drive element is preferably a sleeve or collar 43 adapted to surround the elongated rod 41 with a frictional contact therebetween such as may be created by a leaf spring 44 interposed between the inside walls 45 of the sleeve or collar 43 and the outer surface 46 of the elongated rod member 41. The sleeve or collar 43 may have a bracket 47 for secure attachment to the movable machine member 11 such as upon the carriage 12, as shown.

The frictional drag created by the contact between sleeve or collar 43 and the elongated rod 41 is such as to actuate the valve 20 through pushing or pulling upon radial arm 30.

In the use and operation of my valve actuating mechanism, the movable member 11 is caused to move in one direction through such means as handle 14 and through a distance commensurate with the distance constituting the complete cut across workpieces 19. As the carriage is moved to the right, the frictional contact through spring 44 between sleeve 43 and the elongated rod 41 will immediately cause the valve radius arm 30 to move to the right to the full line position and thereby permit fluid to enter the valve through separate passageways from the supply source and via inlet members 29 and 38. The workpieces 19 have previously been assembled in their proper position beneath the clamp plate 24 prior to operation of the machine. The motor 15 and saw blade 16 are then energized and the handle 14 is pulled to the right so as to move the member comprising carriage 12 and sawing members 15 and 16 transversely of the workpieces. Before the circular saw blade strikes the workpieces 19, the valve arm 30 will be pulled to the right by the action of sleeve 43 in its frictional mounting upon the elongated rod 41. The actuation of valve 28 will permit fluid under pressure to force downwardly the ram extension 23 and clamping plate 24 to firmly hold the workpieces 19 in position against table 18. Thus by the time saw blade 16 begins its sawing operation on the workpieces, the latter will be firmly held in position.

As long as the carriage and sleeve 43 move in the direction of the solid arrow, the valve arm 30 will be maintained in its full line position. The sleeve 43 merely slides in its frictional engagement, and exerting no more than the optimum frictional force created by spring 44. When the carriage and saw blade 16 have advanced to the point where workpieces 19 are severed, which position may be considerably short of the full distance to which the carriage might be moved, the forward progress of the carriage and saw members is immediately stopped and the movable machine member reversed in direction through such means as the manual handle 14 set forth above. As soon as the direction of the movable member is reversed, irrespective of the forward position which it attained, the sleeve 43 will again apply force to the rod 41 but in the opposite direction (dotted line arrow). The valve 28 will be immediately actuated by movement of the radius arm 30 to dotted line position, thereby reversing the direction of flow and permitting fluid to return via passageway 29a as previously described. It is understood, of course, that the hydraulic ram 21 may be provided with internal means such as a compression spring to raise the rod 23 and clamping plate 24 or may be provided with a double acting piston to accomplish raising of the plate. Since these means are well-known in the art, they are not specifically set forth in the diagrammatic showing.

Since the plate is immediately raised from the workpieces 19, they may be physically moved to the side at the same time that saw blade 16 is progressing back to its starting position. Time is thus saved in the cycle of operations so that any new workpieces may be brought up into position during the resetting of the saw blade and carriage preparatory to making another cut.

Simultaneously with the beginning of the forward operation, the valve 28 also opened the passageway from fluid line 38 to outlet 37 and permitted coolant or cutting fluid to pass through flexible tube 36 and be sprayed from the orifice 34 of the machine member 31. In this case, the machine member 31 is mounted in fixed relation with the movable machine member 11 but the valve member 28 remains in relatively movable position so that the same actuator element and the same interconnecting drive element may be employed to operate the valve.

It will be readily seen that my valve actuating mechanism has large application to a number of complex machines in which various of the machine members are relatively movable with respect to others and the moving relation is not constant but actuation of a valve is desired whenever the relative movement is begun in one direction or in the reverse direction.

It will, of course, be understood that various changes may be made in the form, details, arrangement and proportions of the parts without departing from the scope of my invention.

What is claimed is:

1. A valve actuating mechanism comprising, an actuator element attachable to the movable portion of a valve and adapted to actuate said valve for fluid flow therethrough when moved in one direction and to actuate the valve for interrupting said fluid flow when moved in the other direction, and an interconnecting drive element in frictional bearing engagement with said actuator element, one of said valve actuator and said drive element being movable with a machine member and relative to the other whereby said relative movements will maintain the valve at one setting and reverse relative movement will initiate change in the valve setting and maintain the latter for the period of such reverse movement.

2. A valve actuating mechanism comprising, an elongated slide rod attachable to the movable portion of a valve and adapted to actuate said valve for fluid flow therethrough when moved in one direction and to actuate the valve for interrupting said fluid flow when moved in the other direction, and a drive element slidably mounted on said elongated rod in frictional engagement therewith for imparting force longitudinally of said rod, one of said rod and said drive elements being movable with a machine member and relative to the other whereby the relative movement therebetween will maintain said valve at one setting and reverse relative movement will initiate change in the valve setting and maintain the latter for the period of such reverse movement.

3. In a machine having interdependent relatively movable members, a valve system therefor comprising, a valve settable to control fluid flow therethrough, an actuator element operably attached to the valve and adapted to effect fluid control through said valve when reciprocated from one direction to the reverse direction, said valve being adjustably settable to control fluid under pressure to a machine member, and an interconnecting drive element in frictional bearing engagement with the actuator element, said drive element being securable to a reciprocable machine member functioning cooperatively with said first mentioned machine member, whereby movement of said reciprocable member will initiate and maintain the valve in one position to effect fluid control of the first mentioned member and a change of direction in movement of said reciprocable member will also change the direction of the drive element to thereby initiate and maintain said valve at another setting.

4. In a machine having interdependent relatively movable members, a valve system therefor comprising, a valve settable to control fluid flow therethrough, an elongated rod operably attached to the movable portion of said valve and adapted to effect fluid control through said valve when the movable portion is reciprocated from one position to the reverse position, said valve being adjustably settable to control fluid under pressure to a machine member, and an interconnecting drive element mounted in frictional bearing engagement for exerting push and pull upon said elongated rod, said drive element being securable to a reciprocable machine member functioning cooperatively with said first mentioned machine member, whereby movement of said reciprocable member will initiate and maintain the valve at one position to effect fluid control of the first mentioned member and a change of direction in the movement of said reciprocable member will also change the direction of the drive element to thereby initiate and maintain said valve at another setting.

5. In a machine having interdependent relatively movable members, a valve system therefor comprising, a valve settable to control fluid flow therethrough, said valve being mounted rigidly with respect to the body of the machine, an elongated rod operably attached to the valve and adapted to effect fluid control through said valve when reciprocated from one direction to the reverse direction, said valve being adjustably settable to control fluid under pressure to a machine member, and a drive element mounted on a reciprocable member and in slidable friction engagement with said elongated rod whereby to exert push and pull upon said rod during sliding engagement therewith, the movement of said reciprocable member initiating and maintaining the valve in one position to effect fluid control of the first mentioned machine member and a change of direction in the movement of said reciprocable member will also change the direction of the drive element to initiate and maintain said valve at another setting.

6. In a machine having two members adapted to be moved relatively convergently and divergently to an arbitrary degree during operation of the machine, the combination of a control valve for operating one of said members, mounting means on the machine reciprocably carrying the other of said members for producing said relative converging and diverging movement, an actuator element reciprocably connected with said valve for operation thereof, and an interconnecting drive element frictionally engaged with the actuator element for operating said valve with the beginning of relative movement in a converging direction prior to relative movement in a diverging direction, one of said actuator and said interconnecting drive elements being movable simultaneously with movement of the other of said machine members.

References Cited in the file of this patent

UNITED STATES PATENTS

| | | |
|---|---|---|
| 1,185,095 | Hendee | May 30, 1916 |
| 1,405,697 | Thullen | Feb. 7, 1922 |
| 2,437,605 | Karge | Mar. 9, 1948 |

FOREIGN PATENTS

| | | |
|---|---|---|
| 452,317 | Great Britain | Aug. 20, 1936 |